(12) United States Patent
Luz et al.

(10) Patent No.: US 8,213,406 B2
(45) Date of Patent: Jul. 3, 2012

(54) UPLINK TIME SYNCHRONIZATION IN A COMMUNICATION SYSTEM

(75) Inventors: Yehuda Y. Luz, Buffalo Grove, IL (US); Gregory M. Agami, Arlington Heights, IL (US); Vincent M. Sciascia, Huntley, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 320 days.

(21) Appl. No.: 12/758,140

(22) Filed: Apr. 12, 2010

(65) Prior Publication Data
US 2011/0249550 A1    Oct. 13, 2011

(51) Int. Cl.
*H04J 3/06*    (2006.01)
(52) U.S. Cl. .................................................... 370/350
(58) Field of Classification Search ................ 370/503, 370/509, 508, 519, 465, 338, 310, 328, 310.2, 370/330, 216, 229, 230, 252, 349
See application file for complete search history.

(56) References Cited

U.S. PATENT DOCUMENTS

| | | |
|---|---|---|
| 3,740,537 A | 6/1973 | Giles et al. |
| 4,545,061 A | 10/1985 | Hileman |
| 5,245,557 A | 9/1993 | Upton |
| 6,922,388 B1 | 7/2005 | Laroia et al. |
| 8,089,938 B2 * | 1/2012 | Bosch et al. ................. 370/332 |
| 2009/0245227 A1 * | 10/2009 | Chin et al. ................... 370/350 |

FOREIGN PATENT DOCUMENTS

| | | |
|---|---|---|
| EP | 1235367 A2 | 8/2002 |
| WO | 2009120462 A1 | 10/2009 |

OTHER PUBLICATIONS

Patent Cooperation Treaty, International Search Report and Written Opinion of the International Searching Authority for International Application No. PCT/US2011/028436, Aug. 25, 2011, 10 pages.
3GPP TS 36.321 v8.0.0 (Dec. 2007), 3rd Generation Partnership Project; Technical Specification Group Radio Access Network; Evolved Universal Terrestrial Radio Access (E-UTRA) Medium Access Control (MAC) protocol specification (Release 8), Section 5.2.

* cited by examiner

*Primary Examiner* — Kwang B Yao
*Assistant Examiner* — Anh Ngoc Nguyen (57) ABSTRACT

An apparatus and method for uplink time synchronization in a communication system includes a first step 602 of receiving uplink data from a user equipment. A next step 604 includes storing a time error of the uplink data along with a time stamp. A next step 620 includes integrating the time error to provide an accumulated time error. A next step 606, 626 includes dumping the accumulated time error upon the time stamps of the accumulated data meeting a timing condition. A next step 610 includes comparing the accumulated time error against a threshold. A next step 616 includes scheduling a time advance with the user equipment if the accumulated time error exceeds the threshold.

12 Claims, 6 Drawing Sheets

| Use Case | Average Timing Error (microseconds) | | | |
| --- | --- | --- | --- | --- |
| | 0kmph | 30kmph | 120kmph | 200kmph |
| Prior Art, full buffer | 0.39 | 0.75 | 0.79 | 0.78 |
| Prior Art, video | 0.38 | 0.75 | 0.75 | 0.86 |
| Prior Art, web | 0.38 | 1.12 | 4.43 | 7.34 |
| Prior Art, ping | 0.38 | 6.26 | 24.6 | 37.9 |
| Invention, full buffer | 0.01 | 0.5 | 0.62 | 0.81 |
| Invention, video | 0.01 | 0.54 | 0.63 | 0.83 |
| Invention, web | 0.68 | 0.95 | 1.01 | 1.14 |
| Invention, ping | 0.94 | 1.12 | 1.22 | 1.36 |

UPLINK TIME SYNCHRONIZATION IN A COMMUNICATION SYSTEM

FIELD OF THE INVENTION

This invention relates to wireless communication systems, in particular, to a mechanism for uplink time synchronization in a wireless communication system.

BACKGROUND OF THE INVENTION

The Long Term Evolution (LTE) communication standard uses an Orthogonal Frequency Division Multiple Access (OFDMA) protocol. In an OFDMA system, each user equipment (UE) is assigned a frequency sub-channel and a time slot in a physical channel for its communications with a base station, access point, or evolved NodeB (eNodeB). It is important in an OFDMA system to maintain both time and frequency synchronization. If frequency synchronization is lost then orthogonality between the various sub-carriers assigned to other UEs is also lost, which results in interference between UEs. If time error is present, system performance will be degraded due to received signal constellation rotation. Therefore, it is required in LTE that each UE maintains time and frequency synchronization with an eNodeB to which the UE is connected. In particular, all uplink signaling from UEs must be received at the eNodeB base station at the right time, within the boundaries of the cyclic prefix window (about five microseconds for LTE). This is particularly critical for multi-user multiple-input multiple-output (MU-MIMO) implementations of LTE.

To maintain uplink time synchronization, the eNodeB first needs to measure the delay of uplink signaling from each UE. Specifically, the eNodeB can measure a timing error or delay, from each UE, such as when the UE moves relative to its distance from the eNodeB, which will use up some of the UE's delay spread immunity designed into the cyclic prefix window. The actual timing measurement can be taken on an uplink reference signal channel, such as the Physical Uplink Shared Channel (PUSCH). Upon detecting an uplink timing error, the eNodeB can then send to each UE a correction message with a desired Time Advance.

A problem arises in that the PUSCH channel is unique per each UE, and is not always scheduled to carry data, and even when it does, the timing error measurement may be too noisy and unreliable. A regular low pass filter solution can remove noise. However, for high speed traffic such as video streaming, the PUSCH can be scheduled as often as every one millisecond sub-frame, but for low speed traffic such as PING, it may be active only once per one-thousand milliseconds. Therefore, PUSCH measurements can be unreliable, and using a regular low pass filter solution will fail to support both low and high speed data services. In addition, there can be residual synchronization errors in the physical channel after a Media Access Control (MAC) layer synchronization effort. This requires further timing compensation in the eNodeB. Moreover, although timing and frequency error estimate methods based on Cyclic Prefix (CP) correlation are well-known for OFDM signals, these techniques can not be applied to OFDMA systems, especially to an eNodeB receiver where multiple users have their own timing and frequency errors that cannot be separated from each other in PUSCH.

Accordingly, what is needed is a technique to correct the uplink timing error of multiple UEs. It would be of further benefit if this could be accomplished in a noisy environment. It would also be of further benefit if this could be accomplished using uplink timing measurements of unreliable PUSCH signals.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

Skilled artisans will appreciate that common but well-understood elements that are useful or necessary in a commercially feasible embodiment are typically not depicted or described in order to facilitate a less obstructed view of these various embodiments of the present invention.

DESCRIPTION OF THE PREFERRED EMBODIMENTS

The present invention provides a framework to correct the uplink timing error of multiple UEs. The present invention also allows an eNodeB to reliable estimate the time advance adjustment even when the PUSCH channel is very noisy, and even if the user is switching between low and high speed data services. The present invention is applicable to Mixed MU-MIMO, single user (SU-MIMO) and single-input multiple-output (SIMO) implementations.

Figure 1:
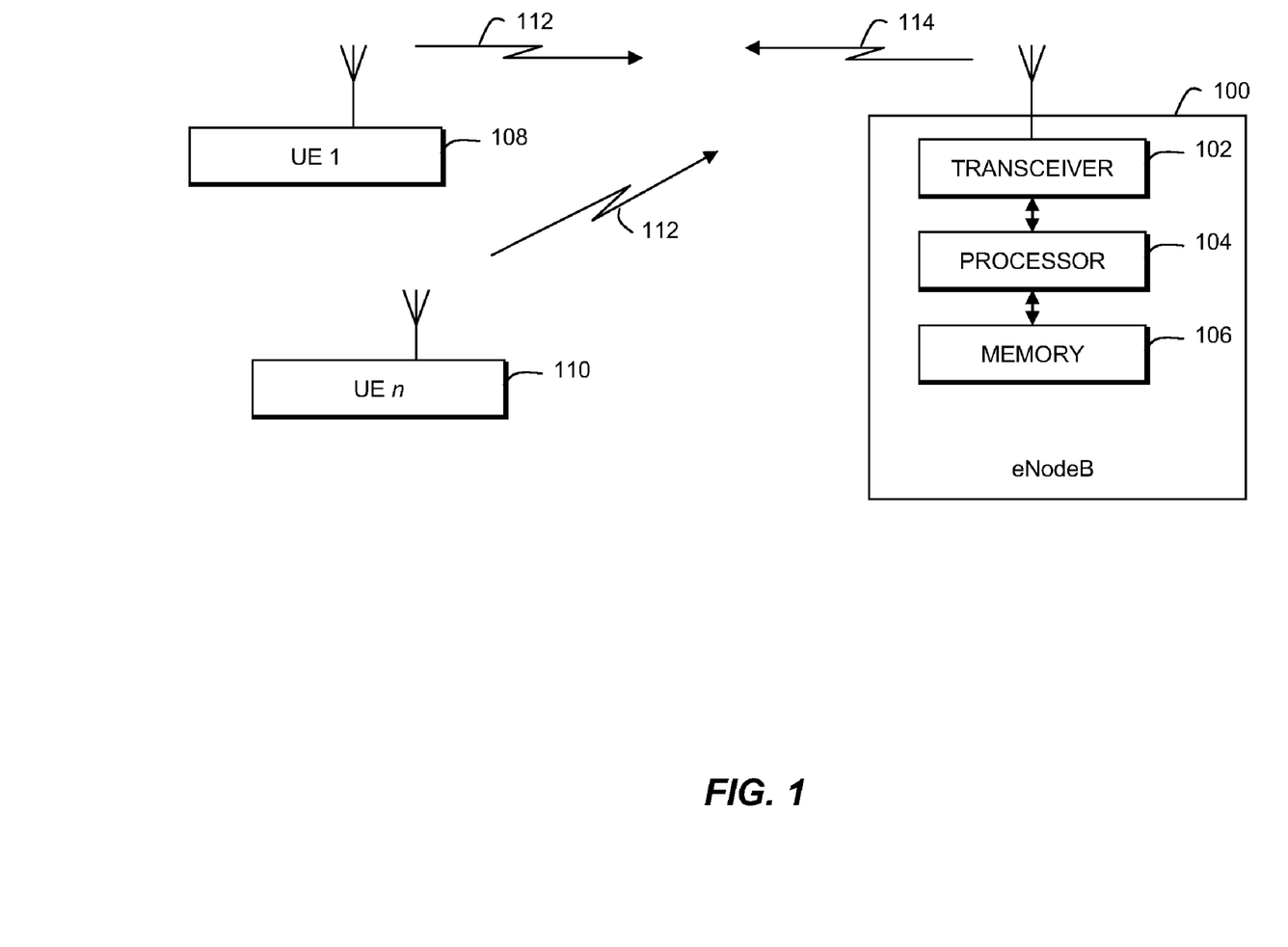
FIG. 1 shows an overview block diagram of a wireless communication system supporting OFDMA, in accordance with the present invention.

FIG. 1 is a block diagram depiction of an OFDMA wireless communication system, such as the Long Term Evolution (LTE), in accordance with the present invention. However, it should be recognized that the present invention is also applicable to other OFDMA systems such as the IEEE 802.16 WiMAX system. At present, standards bodies such as OMA (Open Mobile Alliance), 3GPP (3rd Generation Partnership Project), 3GPP2 (3rd Generation Partnership Project 2) and IEEE (Institute of Electrical and Electronics Engineers) 802 are developing standards specifications for such wireless telecommunications systems. The communication system represents a system operable in a packet data access network that may be based on different wireless technologies. For example, the description that follows can apply to an access network that is IEEE 802.xx-based, employing wireless technologies such as IEEE's 802.11, 802.16, or 802.20, modified to implement embodiments of the present invention.

Referring to FIG. 1, there is shown a block diagram of an eNodeB 100 adapted to support the inventive concepts of the preferred embodiments of the present invention. Those skilled in the art will recognize that FIG. 1 does not depict all of the network equipment necessary for system to operate but only those system components and logical entities particularly relevant to the description of embodiments herein. For example, an eNodeB, access point, or base station can comprise one or more devices such as wireless area network stations (which include access nodes (ANs), Media Access Controllers (MAC), AP controllers, and/or switches), base transceiver stations (BTSs), base site controllers (BSCs) (which include MAC service data units (SDUs)), packet control functions (PCFs), packet control units (PCUs), and/or radio network controllers (RNCs). However, none of these other devices are specifically shown in FIG. 1.

Instead, eNodeB 100 is depicted in FIG. 1 as comprising a processor 104 coupled to a transceiver 102. In general, components such as processors and transceivers are well-known. For example, eNodeB processing units are known to comprise basic components such as, but not limited to, microprocessors, microcontrollers, memory devices, application-specific integrated circuits (ASICs), and/or logic circuitry. Such components are typically adapted to implement algorithms and/or protocols that have been expressed using high-level design languages or descriptions, expressed using computer instructions, expressed using messaging flow diagrams, and/or expressed using logic flow diagrams.

Thus, given an algorithm, a logic flow, a messaging/signaling flow, and/or a protocol specification, those skilled in the art are aware of the many design and development techniques available to implement an eNodeB processor that performs the given logic. Therefore, eNodeB 100 represents a known apparatus that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the eNodeB aspect of the present invention may be implemented in any of the devices listed above or distributed across such components. Furthermore, the various components within the eNodeB 100 can be realised in discrete or integrated component form, with an ultimate structure therefore being merely based on general design considerations. It is within the contemplation of the invention that the operating requirements of the present invention can be implemented in software, firmware or hardware, with the function being implemented in a software processor (or a digital signal processor (DSP)) being merely a preferred option.

The eNodeB 100 uses a wireless interface for communication with multiple mobile stations or user equipment (UE 1 . . . UE n) 108, 110. Since, for the purpose of illustration, eNodeB 100 is LTE-based, wireless interfaces correspond to a forward link and a reverse link, respectively, each link comprising a group of channels and subchannels used in the implementation of various embodiments of the present invention.

User equipment (UE) or remote unit platforms are known to refer to a wide variety of consumer electronic platforms such as, but not limited to, mobile stations, subscriber equipment, mobile nodes, access terminals, terminal equipment, gaming devices, personal computers, and personal digital assistants, all referred to herein as UE. In particular, each UE 108, 110 comprises a processor coupled to a transceiver, antenna, a keypad, a speaker, a microphone, and a display, as are known in the art and therefore not shown.

UEs are known to comprise basic components such as, but not limited to, microprocessors, digital signal processors (DSPs), microcontrollers, memory devices, application-specific integrated circuits (ASICs), and/or logic circuitry. Such UEs are typically adapted to implement algorithms and/or protocols that have been expressed using high-level design languages or descriptions, expressed using computer instructions, expressed using messaging/signaling flow diagrams, and/or expressed using logic flow diagrams. Thus, given an algorithm, a logic flow, a messaging/signaling flow, a call flow, and/or a protocol specification, those skilled in the art are aware of the many design and development techniques available to implement user equipment that performs the given logic.

Each UE 108, 110 provides respectively uplink signals 112 to the transceiver 102 of the eNodeB 100. Each of these uplink signals may present different time delay errors due to MS environmental changes, mobility, timing drift, etc. As these uplink signals 112 may all be transmitted on the same frequency PUSCH, they are not separable by the processor 104 of the eNodeB 100. In accordance with LTE, the uplink signals consist of a Cyclic Prefix (CP) followed by an N-sample block output from each UE processor.

Figure 2:
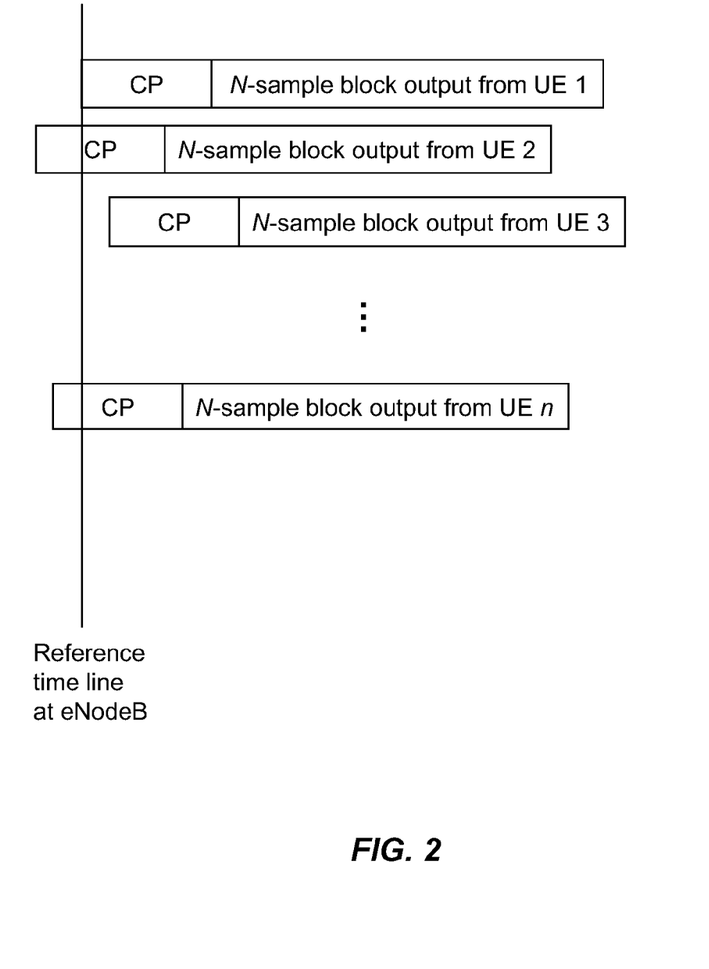
FIG. 2 shows a graphical representation, for different communication devices, of uplink synchronization errors that can presently exist in a LTE communication system.

FIG. 2 illustrates the aggregate uplink timing errors for uplink signals for various UEs, wherein each UE's signal arrives at the eNodeB with a different timing error. The time error for each UE can be estimated by its timing difference from a reference timeline at the eNodeB. During regular data communication, it is reasonable to assume that the uplink timing error is within the CP length. The role of the eNodeB is to monitor/update timing offset due to environmental changes of each MS. Based on the measured timing error, the eNodeB can instruct each UE to adjust its uplink transmit time accordingly. However, noise, data rate, and UE mobility introduce errors, as previously described above. Also as mentioned before, a filter such as an infinite impulse response low-pass filter is able to handle noise problems when presented with a substantially uniform rate of data. However, such filter is not able to handle discontinuous data such as PING data, where an expected signal from the UE is only noise most of the time, and the actual data comes very seldom and at long intervals. In this case, this filter does not generate enough signal energy at its output to determine timing errors.

In accordance with the present invention, the eNodeB processor implements a novel, Integrate $ Dump state machine, using advanced time stamp techniques along with the following approach to accumulate time error:

$$y_M = \sum_{n=1}^{M} \{x(n) + W(n)F(x(n), x(k-1))\}$$

where $y_M$ is the output of the state machine that is dumped once the integration is performed over M programmable samples. The input sample data $x(n)$ is the reference signal frequency error for user n within the PUSCH. Whenever the media access controller (MAC) scheduler is sending a new decode request to the PHYsical channel, the MAC will count it as the next $x(n)$ sample. When the integration is done (n=M), the state machine will reset (dump) its results in preparation for the next integration cycle.

$W(n)$ is a weighting function, which is optimized for code speed and memory space saving. Storing $x(n)$ for M samples will take up a lot of memory space and a lot of time to scan all the values along the buffer. The $W(n)$ function simply saves memory and time by only accumulating the valid data as:

$$W(n) = \begin{cases} 0; & \text{if } x(n) \text{ has a bad } CRC \\ 0; & \text{if } x(n) \text{ is not scheduled} \\ n-k; & \text{otherwise} \end{cases}$$

It should be noted that a time stamp difference between x(n) and the previous x(n−1) is not constant since it may vary by the decision of the scheduler. When an x(n) is missing, due to lack of traffic or for a bad cyclic redundancy check (CRC) on the uplink, this will result a missing sample or hole in the integration. These holes (missing samples) can be estimated using an advanced filling function F {x(n),x(k−1)}, in accordance with the present invention. In particular, this function will interpolate the missing samples between k+1 and n−1, where k was the last valid sample the MAC registered, and the latest valid sample is filled by the function:

$$F\{x(n), x(k+1)\} = \begin{cases} [x(n)+x(k-1)]/2; & \text{when } 1 \le (n-k) \le T_{sp} \\ (n-k-1)x(n); & \text{when } (n-k) > T_{sp} \\ x(n); & \text{otherwise} \end{cases}$$

where $T_{sp}$ is a programmable time stamp threshold which is determined empirically for best performance. In particular, when sampled data x(n) has a new good CRC, its time error measurement is stored along with a time stamp, Ts(n), in the eNodeB memory. When a new sample data is added, the age of the previous data is tested. If the old time stamp of the previous data is older than the current time stamp by $T_{sp}$ the old data is discarded. In practice trials, $T_{sp}$ was optimized to two seconds. In addition, if the old time stamp is larger than the current time stamp then this indicates a wraparound condition, and the old data is discarded (wraparound represents that the time gap was too long). If the old data was discarded, all of the previous data is also discarded. Otherwise, the accumulator adds the new value using the $y_M$ formula.

The accumulator adds M samples over a total time period of Tk, which must be slow enough to save overhead traffic over the air, but short enough to follow a user travelling at a 300 km/hour speed. Tk is determined empirically for best results. In trials, M=500 msec was used as the default. After Tk, and if needed, the eNodeB will send a time-advance correction message to that UE. Typically, each time-advance correction message will freeze the UE receiver operation to about 50 msec.

It is not desired to have a time-advance correction every 500 msec unless absolutely necessary. To prevent this, the accumulated signal $y_M$ is compared to an accumulation threshold, Th, which will eliminate unnecessary time-advance correction messages to only those cases where the accumulated signal was strong enough. The accumulation threshold is chosen for different UE configurations as:

$$Th = \begin{cases} 1/M; & MU-MIMO \\ 2/M; & SU-MIMO \text{ Rank 2} \\ 1/M; & SU-MIMO \text{ Rank 1} \\ 1/M; & SIMO \end{cases}$$

Figure 3:
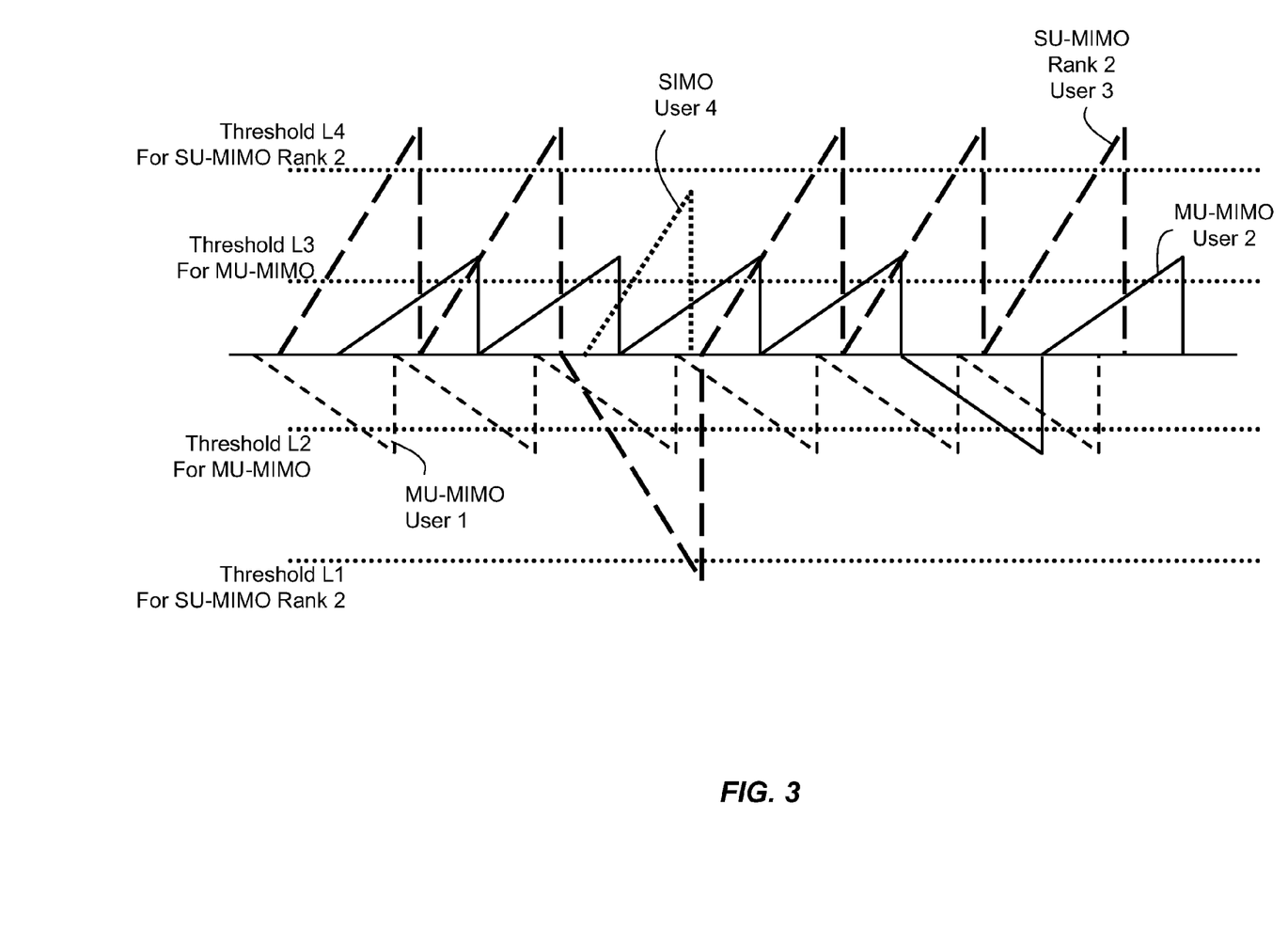
FIG. 3 shows a graphical representation of state machine operation for different user configurations, in accordance with the present invention.

FIG. 3 illustrates the accumulated integration and dump function for four different user configurations; multi-user multiple-input multiple-output (MU-MIMO), single-user multiple-input multiple-output (SU-MIMO) of ranks 1 and 2, and single-input multiple-output (SIMO). For MU-MIMO, in one example (MU-MIMO User 1) the accumulated integration and dump always accumulated negative (or positive) values, and the dump is triggered when the accumulator crosses Threshold L2, and in another example (MU-MIMO User 2) the accumulated integration and dump can accumulated positive or negative values, and the dump is triggered when the accumulator crosses either of Threshold L2 or L3. For uplink SU-MIMO users of either Rank 1 or Rank 2 (SU-MIMO User 3), there will be twice as many measurements of either accumulated positive or negative values, and therefore a threshold twice as high is needed to trigger the dump when the accumulator crosses either of Threshold L1 or L4. For SIMO users (User 4) the accumulator will continue to integrate for a full total time period (Tk) before dumping, even after reaching Threshold L3.

EXAMPLE

Simulation data show that the present invention performs very well. In fact, it is superior in terms of estimating timing error than the prior art techniques. To evaluate performance of the proposed technique of the present invention, simulations have been conducted, using the data of FIG. 4, which at the top shows raw data of two widely spaced PING traffic events with only noise between, followed by full buffer traffic, with one instance of a bad (CRC) resulting in missing data. As shown at the bottom, the present invention provides filling of the noisy and missing areas, which are then filtered as described above. In the example shown, missing data is linearly interpolated as a single value between actual uplink data. However, it should be recognized that other more uniform filling functions could be used. The simulation was performed simulating different kinds of data traffic including full buffer traffic, video traffic, (internet) web traffic, and ping traffic, comparing the present invention against the prior art (CP correlation) technique.

Figure 4:
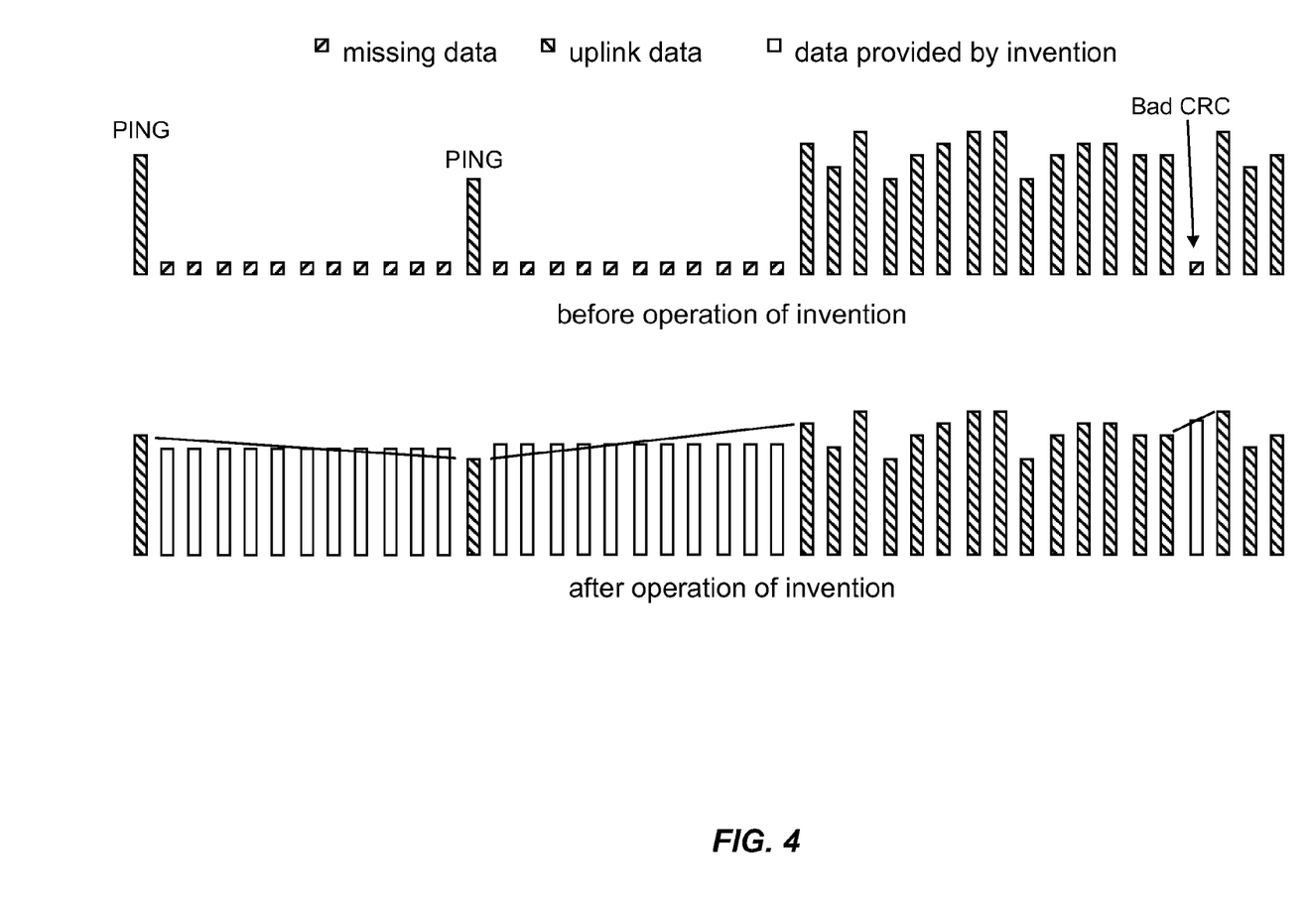
FIG. 4 shows a graphical representation of simulated data traffic, in accordance with the present invention.
Figure 5:
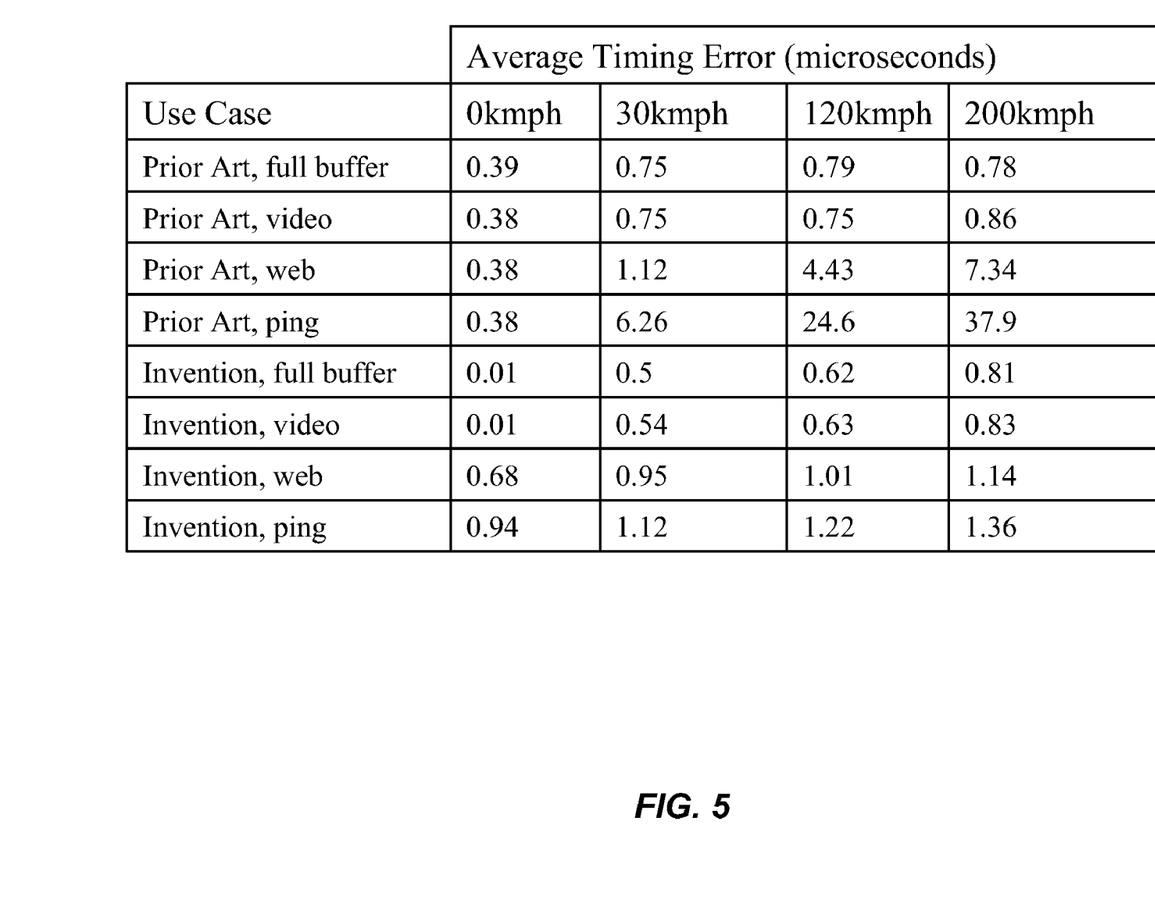
FIG. 5 illustrates simulation results demonstrating a time error improvement, in accordance with the present invention.

FIG. 5 shows the simulation results for the data at the bottom of FIG. 4 using the various data traffic models. Based on the results, it can be seen that the proposed technique of the present invention works well in all conditions. In particular, the simulation results show that the prior art technique has an average timing error of more than 4.43 µs for web services when UE speed is more than 120 kph, and a timing error of more than 6.26 µs for ping traffic when UE speed is more than 30 kph. In contrast, the results for the present invention show that the timing error is below 1.36 µs in all cases, even at speeds of 200 kph. This demonstrates a better than three-time improvement in time error reduction over the prior art technique.

Figure 6:
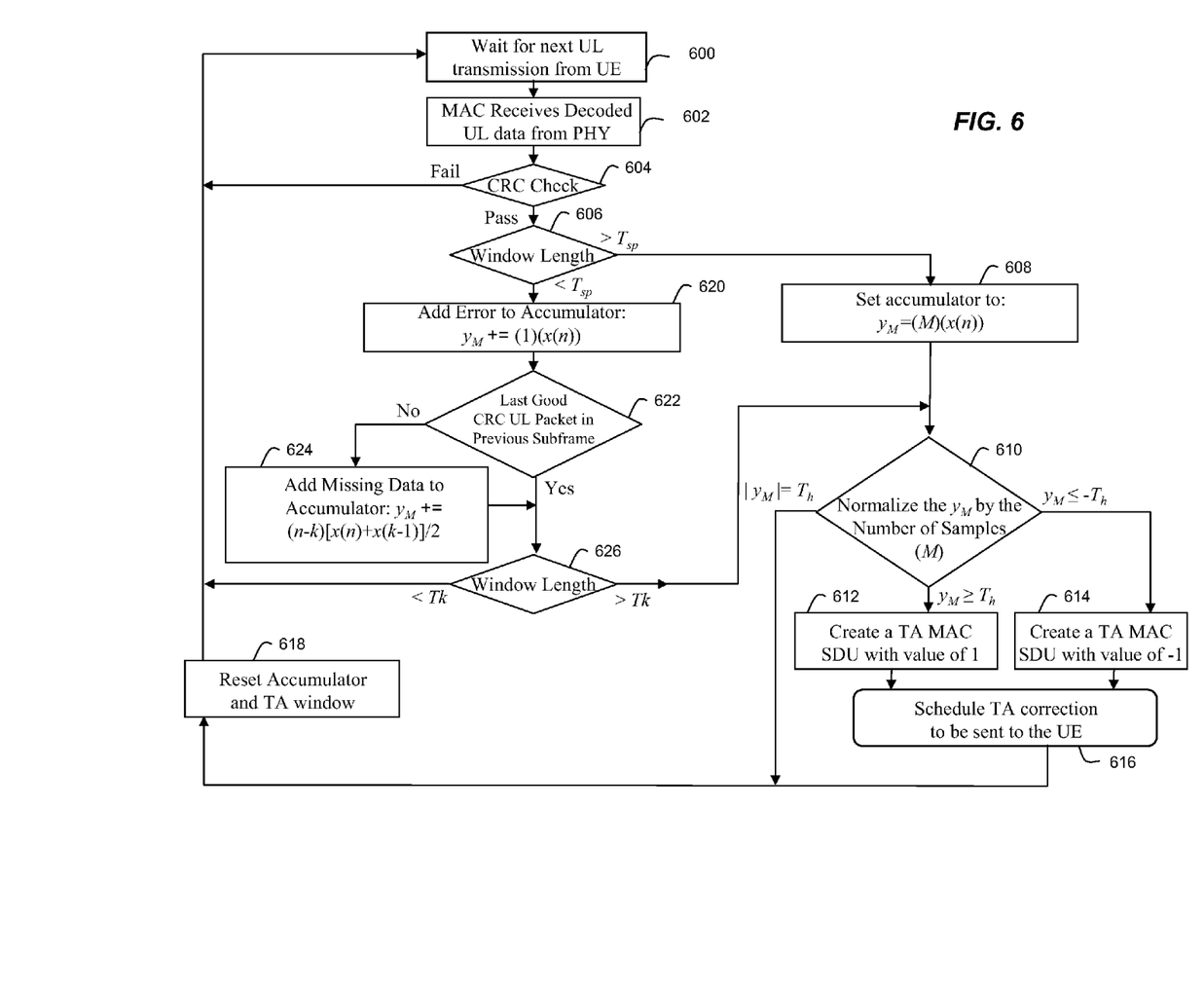
FIG. 6 is a flow chart illustrating a method, in accordance with the present invention.

FIG. 6 shows a flowchart that illustrates a method for uplink time synchronization in a communication system, in accordance with the present invention. It is envisioned that this method is primarily performed in a network entity such as an eNodeB processor. A first step 600 includes an eNodeB transceiver receiving an uplink transmission from a UE. Preferably, this includes an eNodeB transceiver receiving a Physical Uplink Shared Channel (PUSCH) from each of a plurality of UEs, where a Media Access Controller (MAC) receives decoded uplink data from the physical channel 602.

A next step 604 includes the MAC performing a Cyclic Redundancy Check (CRC) on the data to check for good data, wherein if the CRC fails, returning to step 600 to wait for more uplink data from that UE. Otherwise, a time error of the data is stored in the eNodeB memory, along with a time stamp, and sent on to be integrated over time. For example, time error can be estimated by comparing a timing of the uplink transmission against a baseline in the eNodeB.

A next step 606 includes checking that a time length between the first and last stored time stamps of the accumulated and integrated data does not exceed a maximum time window, $T_{sp}$. Upon reaching a maximum time window length or period, the method proceeds with the Dump function, as will be detailed below. Otherwise, the UL data, x(n), is added 620 to the integration accumulator.

A next step 622 includes checking if the last packet received in the previous subframe contains valid data (i.e. is not missing UL data or data had a bad CRC). If there is a problem with that last data then there will be a hole in the integration, in which case the method replaces 624 that last invalid data with interpolated data as previously described. Otherwise, the method checks 626 whether a time length between the first and last stored time stamps of the accumulated data exceeds a minimum time window or collection period, $T_k$. If not, more data is collected 600. If so, then the integration can be Dumped.

The Dump function occurs when the time stamps of the accumulated data either exceed a maximum time window $T_{sp}$ 606 or exceed a minimum collection period $T_k$ 626. In the former case, the method sets 608 the accumulator $y_M=M(x(n))$, where M is the number of samples in the integration. In either case, the method then normalizes 610 the integrated time error by the number of samples, M. The normalized time error is then compared against a threshold $T_h$. If this comparison results in an absolute time error less than the threshold, no time advance correction is needed and the accumulator and collection window can be reset 618. If the comparison results in a positive time error greater than a threshold $T_h$, then the MAC SDU creates 612 a time advance of 1 and schedules 616 a time advance correction with the UE before resetting 618 the accumulator and collection window. If the comparison results in a negative time error less than a threshold $-T_h$, then the MAC SDU creates 614 a time advance of −1 and schedules 616 a time advance correction with the UE before resetting 618 the accumulator and collection window. The UE corrects it uplink transmission timing in response to the scheduled time advance correction from the MAC SDU.

It should be noted that from the MAC Spec (3GPP TS 36.321, Sec. 5.2), there is defined a Timing Alignment Window in which the UE must receive a timing alignment command regardless of the circumstances of when UL data is sent. The present invention ignores this entirely and is valid if the timing alignment window is set to infinity. So in practice, the MAC starts a timer (shorter than the Timing Alignment Window to allow for the transmission of the TAC (Timing Alignment Command). If no timing alignment command is sent by the time the timer expires, the TAC is generated. This can be simply included into the present invention if the timer expiration is treated as a 0 error input which is sent directly to step 608, or it can be handled as a 0 error input.

It should also be noted that since the present invention has a relatively short well defined window on when the timing alignment command needs to be sent, it is not necessary to reset the accumulator as described above. Instead, the Timing Alignment Window can be defined to be the $T_{sp}$ time. If a UL transmission is received between times $>T_k$ and $<T_{sp}$ and the normalized value is less than the threshold, where the current algorithm just resets the accumulator, an optional algorithm can just continue accumulating until the threshold $T_h$ is met or the $T_{sp}$ is reached. If the $T_{sp}$ is reached, the TAC can be sent regardless of the threshold (usually 0 since the threshold was not met previously).

Optionally, a confidence metric can be implemented where if enough data points are actually received (i.e. very few gaps), the actual normalized correction can be sent instead of the +1 or −1 limit that is described above. However, if there is low confidence (i.e. too many gaps), the +1 or −1 limit can be used as described above.

Advantageously, the present invention improves performance for both full buffer as well as sporadic data traffic services. In addition, the present invention supports high speed data and low speed data mixers when driving at high speeds (e.g. greater than 90 km/hour). The present invention provides a saving in time advance adjustments processing per user which translates into a savings in processing resources. The present invention provides better performance for uplink low data services (such as ping) when combined with high data rate services.

Although the preferred embodiment of the present invention is described with reference to base stations in a LTE wireless communication system, it will be appreciated that the inventive concepts hereinbefore described are equally applicable to any OFDMA wireless communication system where synchronization of communication units is an issue.

It will be understood that the terms and expressions used herein have the ordinary meaning as is accorded to such terms and expressions by persons skilled in the field of the invention as set forth above except where specific meanings have otherwise been set forth herein.

The sequences and methods shown and described herein can be carried out in a different order than those described. The particular sequences, functions, and operations depicted in the drawings are merely illustrative of one or more embodiments of the invention, and other implementations will be apparent to those of ordinary skill in the art. The drawings are intended to illustrate various implementations of the invention that can be understood and appropriately carried out by those of ordinary skill in the art. Any arrangement, which is calculated to achieve the same purpose, may be substituted for the specific embodiments shown.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

What is claimed is:

1. A method for uplink time synchronization in a communication system, the method comprising the steps of:
   receiving uplink data from a user equipment;
   storing a time error of the uplink data along with a time stamp;
   integrating the time error in an accumulator to provide an accumulated time error;
   dumping the accumulated time error upon the time stamps of the accumulated data meeting a timing condition;
   comparing the accumulated time error against a threshold; and
   scheduling a time advance with the user equipment if the accumulated time error exceeds the threshold.

2. The method of claim 1, wherein the accumulated time error is:

$$y_M = \sum_{n=1}^{M} \{x(n) + W(n)F(x(n), x(k-1))\}$$

where x(n) is the time error of sample n, k is a last valid sample, M is a total number of accumulated samples, W is a weighting function, and F is a filling function for missing data.

3. The method of claim 1, wherein the integrating step includes removing invalid data using a weighting function.

4. The method of claim 3, wherein the weighting function is $$W(n) = \begin{cases} 0; & \text{if } x(n) \text{ has a bad } CRC \\ 0; & \text{if } x(n) \text{ is not scheduled} \\ n-k; & \text{otherwise} \end{cases}$$

where x(n) is input sampled data, n is a last sample, and k is a last valid sample.

5. The method of claim 1, wherein the integrating step includes filling in missing data.

6. The method of claim 5, wherein the filing function for missing data is $$F\{x(n), x(k+1)\} = \begin{cases} [x(n) + x(k-1)]/2; & \text{when } 1 \leq (n-k) \leq T_{sp} \\ (n-k-1)x(n); & \text{when } (n-k) > T_{sp} \\ x(n); & \text{otherwise} \end{cases}$$

where x(n) is input sampled data, n is a last sample, k is a last valid sample, and Tsp is a maximum time window.

7. The method of claim 1, wherein the comparing step includes normalizing the accumulated time error by a number of samples.

8. The method of claim 1, wherein the threshold (Th) of the comparing step is chosen for different given UE configurations as:

$$Th = \begin{cases} 1/M; & MU-MIMO \\ 2/M; & SU-MIMO \text{ Rank } 2 \\ 1/M; & SU-MIMO \text{ Rank } 1 \\ 1/M; & SIMO \end{cases}$$

where M is a number of accumulated samples.

9. The method of claim 1, wherein in the dumping step, the timing condition is a length of the time stamps of the accumulated data exceeding a maximum time window.

10. The method of claim 9, wherein the accumulated time error is set to a number of uplink data samples times a time error of a last sample.

11. The method of claim 1, wherein in the dumping step, the timing condition is a length of the time stamps of the accumulated data exceeding a minimum time window.

12. An eNodeB operable for uplink synchronization of mobile stations in a communication system, the eNodeB comprising:
   a transceiver operable to receive user equipment uplink data transmissions; and
   a processor coupled to the transceiver, the processor operable to store a time error of the uplink data along with a time stamp, integrate the time error in an accumulator to provide an accumulated time error, dump the accumulated time error upon the time stamps of the accumulated data meeting a timing condition, comparing the accumulated time error against a threshold, and scheduling a time advance to be sent by the transceiver to the user equipment if the accumulated time error exceeds the threshold.

* * * * *